Feb. 9, 1932.   S. FRYCKBERG   1,844,316
BORING AND GRINDING MACHINE
Filed May 27, 1929   2 Sheets-Sheet 1

Inventor:
Samuel Fryckberg,
By Edwin B.H. Tower, Jr.
Atty.

Feb. 9, 1932. S. FRYCKBERG 1,844,316
BORING AND GRINDING MACHINE
Filed May 27, 1929 2 Sheets-Sheet 2

Inventor:
Samuel Fryckberg,

Patented Feb. 9, 1932

1,844,316

UNITED STATES PATENT OFFICE

SAMUEL FRYCKBERG, OF PORT WASHINGTON, WISCONSIN, ASSIGNOR TO SIMPLICITY MANUFACTURING COMPANY, OF PORT WASHINGTON, WISCONSIN, A CORPORATION OF WISCONSIN

BORING AND GRINDING MACHINE

Application filed May 27, 1929. Serial No. 366,479.

This invention relates to boring and grinding machines.

The boring and grinding machine to which the invention applies in particular has a horizontal base for attachment to an engine cylinder, a vertical standard carried by the base, an outer tool shaft journaled in the standard, an inner tool shaft carried in the outer shaft and rotatable independently thereof, means to move said shaft vertically, and an inner shaft drive movable vertically in unison with the inner shaft such as the grinding machine disclosed in my copending application Serial No. 366,480, filed May 27, 1929.

This machine is ordinarily employed for reboring and regrinding engine cylinders and it is desirable that all the cylinders of an engine be finished to the same standard oversize with the removal of a minimum of metal.

After one or more cylinders of an engine have been refinished, it often happens that one or more cylinders will be found whose axes are not parallel to the axes of the finished cylinders or which are worn so unevenly that the same cannot be finished to the predetermined oversize.

This situation is caused by setting the machine in alinement with the top of the cylinder or from attempting to set the machine in alinement with some other part of the cylinder without the aid of adequate tools.

An object of this invention is to provide a machine which may be quickly and accurately arranged in position for refinishing a cylinder.

Another object is to provide a centering tool which will so position a machine relatively to a cylinder that only a minimum of metal need be removed to refinish the same.

Another object is to provide a centering tool which is interchangeable with the boring and grinding tools of the machine.

Another object is to provide a centering tool which is operated by the grinding shaft of the machine.

Another object is to provide a tool which is sturdy in construction and which may be readily and economically manufactured.

According to the invention as it is ordinarily embodied, the machine is provided with a centering tool which has a head for attachment to the outer tool shaft of the machine, centering fingers slidably arranged in the head, and a plunger threaded in the head and adapted to be advanced by the inner shaft of the machine to extend the fingers.

A boring and grinding machine in which the invention is embodied is shown in the accompanying drawings in which the views are as follows.

Figure 1:
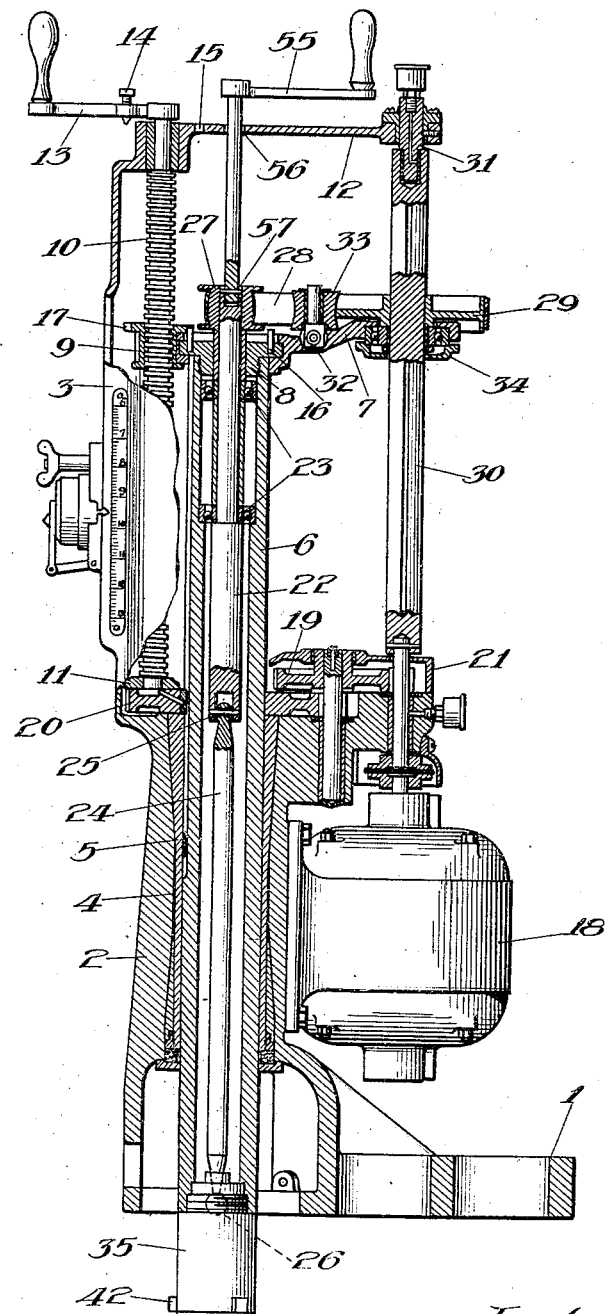
Fig. 1 is a side elevation, partly in central section.

The mechanism of the machine is carried by a frame having a horizontal base 1 for attachment to an engine cylinder, a vertical standard 2 which may be formed integral with the base 1, and an upper frame or housing 3 arranged upon the standard.

The standard 2 has a vertical bore 4 which tapers inwardly from each end thereof and contains a take-up bearing 5 in which a tubular outer shaft 6 is journaled and adapted to carry either a boring tool or a grinding tool at its lower end.

The take-up bearing 5 is adapted to compensate for wear and is so constructed that it may be contracted or expanded throughout its length to provide an accurate and close fitting bearing at all times and enable the machine to produce work of great accuracy.

The shaft 6 is supported and moved vertically by a shaft carrier 7 having a thrust bearing connection with the flanged head 8 of the shaft 6 and with a rotatable feed nut 9 which forms a part of the shaft carrier and is threaded upon a feed screw 10 arranged alongside the shaft 6 and journaled in the base 11 and the top 12 of the upper frame 3.

A hand crank 13 is attached to the upper end of the feed screw 10, for rotating the same to raise or lower the shaft 6 manually when the machine is not in operation, and provided with a thumb screw 14 for engaging an aperture 15 in the top 12 to hold the feed screw against rotation when the machine is in operation.

The shaft 6 is automatically advanced during rotation thereof by feed pins 16 which are arranged in sockets in the head 8 to engage teeth 17 formed on the upper flange of the feed nut 9 and impart rotary movement thereto so that the feed nut is fed along the feed screw as the shaft 6 rotates.

The outer shaft 6 is driven by a motor 18 which is arranged upon the standard 2 and connected by a train of gears 19 to a gear 20 splined on the shaft 6.

The gear 20 is arranged in a recess formed in the top of the standard 2 and held against vertical movement by the base 1 of the upper frame 3 which may also carry a plate 21 to enclose the gear train 19.

The grinding tool is driven by an inner or grinding shaft which is carried in the outer shaft 6 and has an upper section 22 arranged in bearings 23 and a lower section 24 having a ball and socket connection 25 with the section 22 and a ball and pin connection 26 at its lower end to form a universal joint with the grinding spindle of the grinding tool or with the plunger of the centering tool.

The upper section 22 of the grinding shaft has a driven pulley 27 fixed to its upper end and spaced by suitable sleeves from the bearings 23 to support the grinding shaft in the shaft 6 and permit independent rotation thereof.

A belt 28 connects the pulley 27 with a driving pulley 29 splined on a driving shaft 30 which has its upper end journaled on a stub shaft 31 carried by the top 12 of the upper frame 3 and its lower end connected to the shaft of the motor 18.

An automatic belt tightener 32 is carried by the shaft carrier 7 and provided with a pulley 33 which engages the belt 28 to maintain the tension thereof.

The hub of the driving pulley 29 is journaled in a bearing 34 carried by the shaft carrier 7 and is fixed for vertical movement therewith so that the inner shaft drive is moved positively along the driving shaft 30 as the outer and the inner shafts move vertically.

The machine is brought into alinement with a cylinder to be refinished by means of a centering tool 35 having a tubular head 36 which is provided with a threaded extension 37 to engage the internally threaded lower end of the shaft 6 and with an annular shoulder 38 to abut the end of said shaft.

The tool 35 is precisely alined with the shaft 6 and the alinement positively maintained by a concentric part 39 formed on the extension 37 and engaging a complementary concentric surface 40 in the lower end of said shaft.

The lower end of the head 36 is provided with radial slots 41 containing centering fingers 42 which are secured therein by a ring or plate 43 attached to the bottom of the head 36 by screws 44.

The inner ends of the fingers 42 extend into the bore 45 of the head 36 and abut the conical end 46 of a plunger 47 arranged therein and having the lower part thereof slidably fitted in the lower end of the bore 45 and the upper end thereof threaded to engage the threaded upper part of the bore 45.

The plunger 47 may be made from a single piece of metal and provided with a central bore 48 and diametrically opposed grooves or slots 49 to accommodate the ball and pin connection 26 on the shaft section 24 by means of which the plunger 47 is rotated to advance the same and extend the fingers 42.

Figure 2:
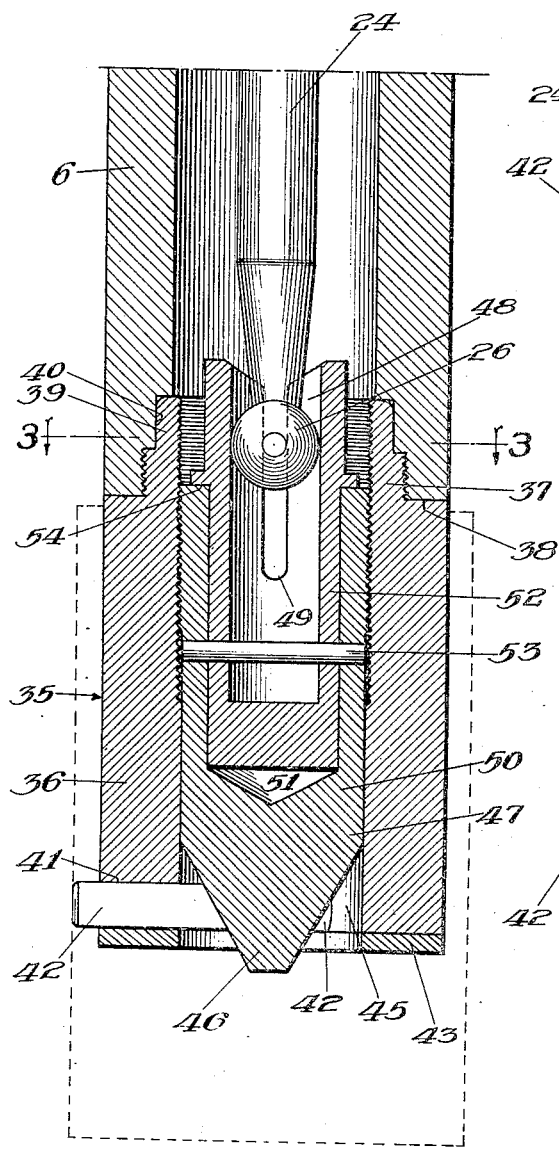
Fig. 2 is a central vertical section through the tool.
Figure 3:
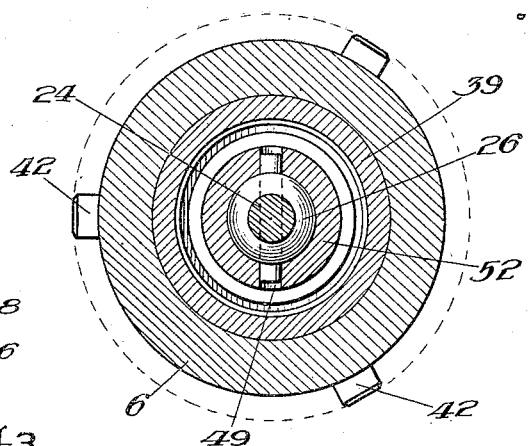
Fig. 3 is a section on the line 3—3 of Fig. 2.
Figure 4:
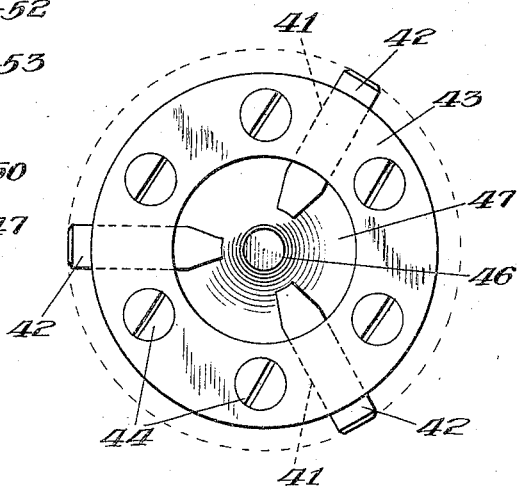
Fig. 4 is a bottom plan view of the tool.

Preferably however, the outer part 50 of the plunger 47 has a central bore 51 in which is snugly fitting socket 52 is secured by a pin 53, and the bore 48 and the slots 49 are formed in the socket 52, as shown in Fig. 2.

The socket 52 may also have an annular shoulder 54 to abut the top of the outer part 50 and be held thereagainst by the pin 53.

In refinishing the cylinders of an engine, the greatest diameter and the inclination of the axes, if any, of the cylinders are ascertained.

The machine is placed upon the cylinder block and the tool 35 lowered into a cylinder by turning the crank 13 until the fingers 42 are at the point of greatest variation or, if the axis of the cylinder is not at right angles to the top of the cylinder block, at the center of the cylinder.

The stem of a hand crank 55 is then passed through an opening 56 in the top 12 of the upper frame 3, inserted in a socket 57 formed in the top of the inner shaft section 22, and the crank turned to rotate the inner shaft and advance the plunger 47.

The conical end 46 of the plunger 47 will force the fingers 42 against the walls of the cylinder and cause the tool 35 to positively and precisely aline the shaft 6 with that particular point in the cylinder.

The base 1 of the machine is then bolted or clamped to the cylinder block, the crank 55 turned to retract the plunger 47 and release the fingers 42, the crank 13 turned to raise the shaft 6, the centering tool replaced by a boring tool or a grinding tool, and the machine operated to refinish the cylinder.

The use of this tool thus permits all the cylinders of an engine to be refinished precisely to the same diameter with the removal of a minimum of metal.

The invention herein set forth is susceptible of various modifications and adaptations without departing from the scope thereof as hereafter claimed.

The invention is hereby claimed as follows:

1. A boring and grinding machine, comprising a frame a rotatable and slidable outer tool shaft, an inner tool shaft carried in said outer shaft and rotatable independently thereof, a centering head detachably connected to said outer shaft, centering fingers arranged in said head and extendable to engage the walls of a cylinder, and means for extending said fingers carried in said head and connected to said inner shaft to be operated thereby.

2. A boring and grinding machine, comprising a frame a rotatable and slidable outer tool shaft, an inner tool shaft carried in said outer shaft and rotatable independently thereof, a centering head detachably connected to said outer shaft, centering fingers arranged in said head and extendable to engage the walls of a cylinder, and a plunger carried in said head and operated by said inner shaft to extend said fingers.

3. A boring and grinding machine, comprising a frame a rotatable and slidable outer tool shaft, an inner tool shaft carried in said outer shaft and rotatable independently thereof, a centering head detachably connected to said outer shaft, centering fingers arranged in said head and extendable to engage the walls of a cylinder, a plunger threaded in said head and connected to said inner shaft to be rotated thereby, and a conical end on said plunger engaging said fingers to extend the same.

4. A boring and grinding machine, comprising a frame a rotatable and slidable outer tool shaft, an inner tool shaft carried in said outer shaft and rotatable independently thereof, a centering head detachably connected to said outer shaft and having slots arranged radially in the lower end thereof, centering fingers arranged in said slots, a plate attached to said head to retain said fingers in said slots, and a plunger arranged in said head and operated by said inner shaft to extend said fingers.

5. A centering tool, for a boring and grinding machine having a rotatable and slidable outer shaft and an independently rotatable inner shaft provided at its lower end with a ball and pin connection, comprising a head for attachment to said outer shaft, centering fingers carried by said head to engage the walls of a cylinder, and a plunger threaded in said head and having an axial bore intersected by slots to receive the ball and pin connection on said inner shaft and be rotated thereby to extend said fingers.

6. A centering tool, for a boring and grinding machine having a rotatable and slidable outer tool shaft and an independently rotatable inner tool shaft carried within said outer shaft and provided at its lower end with a ball and pin connection, comprising a head for attachment to said outer shaft, centering fingers carried by said head to engage the walls of a cylinder, a plunger threaded in said head and having an axial bore, and a slotted socket fixed in said bore to receive said ball and pin connection and enable said inner shaft to rotate said plunger to advance the same and extend said fingers.

7. A centering tool, for a boring and grinding machine having a rotatable and slidable outer tool shaft and an independently rotatable inner tool shaft carried within said outer shaft and provided at its lower end with a ball and pin connection, comprising a head for attachment to said outer shaft, centering fingers carried by said head to engage the walls of a cylinder, a plunger threaded in said head and having an axial bore a slotted socket fixed in said bore to receive said ball and pin connection and enable said inner shaft to rotate said plunger to advance the same and extend said fingers, and an annular shoulder carried by said socket and abutting the end of said plunger.

8. A centering tool, for a boring and grinding machine having a rotatable and slidable tubular outer shaft provided at its lower end with an inner concentric surface and internal threads and containing an independently rotatable inner tool shaft provided at its lower end with a ball and pin connection, comprising a head, a concentric surface on said head to engage the concentric surface on said outer shaft, threads formed on said head for engaging the threads on said outer shaft to secure said head thereto, a shoulder on said head to abut the end of said outer shaft, centering fingers carried by said head, a plunger threaded in said head and having an axial bore, and a slotted socket fixed in said bore to receive said ball and pin connection and enable said inner shaft to rotate said plunger to advance the same and extend said fingers.

In witness whereof I have hereunto subscribed my name.

SAMUEL FRYCKBERG.

CERTIFICATE OF CORRECTION.

Patent No. 1,844,316.                                                       February 9, 1932.

SAMUEL FRYCKBERG.

It is hereby certified that error appears in the printed specification of the above numbered patent requiring correction as follows: Page 2, line 85, for "is" first occurrence read a; page 3, lines 1, 12, 22 and 34, claims 1, 2, 3 and 4, respectively, after the word "frame" insert a comma; same page, lines 2, 13, 23 and 35, claims 1, 2, 3 and 4, respectively, after "shaft" first occurrence, insert the words journaled in said frame; and that the said Letters Patent should be read with these corrections therein that the same may conform to the record of the case in the Patent Office.

Signed and sealed this 6th day of September, A. D. 1932.

(Seal)                                                   M. J. Moore,
                                                      Acting Commissioner of Patents.